United States Patent
Harris

(10) Patent No.: US 10,160,362 B2
(45) Date of Patent: Dec. 25, 2018

(54) VEHICLE SEAT ACCESSORY MOUNTING SYSTEM

(71) Applicant: Victor Harris, Dubai (AE)

(72) Inventor: Victor Harris, Dubai (AE)

(73) Assignee: NSV Group FZCO, Dubai (AE)

( * ) Notice: Subject to any disclaimer, the term of this patent is extended or adjusted under 35 U.S.C. 154(b) by 180 days.

(21) Appl. No.: 15/223,117

(22) Filed: Jul. 29, 2016

(65) Prior Publication Data

US 2017/0028927 A1    Feb. 2, 2017

Related U.S. Application Data

(60) Provisional application No. 62/199,668, filed on Jul. 31, 2015.

(51) Int. Cl.
*A47C 7/62* (2006.01)
*B60N 2/882* (2018.01)
*B60N 2/90* (2018.01)
*B60N 2/815* (2018.01)
*B60R 11/02* (2006.01)
*B60R 11/00* (2006.01)

(52) U.S. Cl.
CPC ............ *B60N 2/882* (2018.02); *B60N 2/815* (2018.02); *B60N 2/90* (2018.02); *B60R 11/02* (2013.01); *B60N 2002/905* (2018.02); *B60R 2011/0017* (2013.01)

(58) Field of Classification Search
CPC .......... B60N 2/882; B60N 2/879; B60N 2/90; B60N 2/815; B60N 2002/905; B60R 11/02; B60R 11/0235; B60R 2011/0017; B60R 11/0229; Y10S 248/917

USPC ... 297/188.04, 188.06, 463.1, 217.3, 188.01; 224/275; 248/917

See application file for complete search history.

(56) References Cited

U.S. PATENT DOCUMENTS

| 6,116,485 | A | * | 9/2000 | Watkins | .................. B60R 11/04 224/275 |
| 7,070,237 | B2 | | 7/2006 | Rochel | |
| 7,201,443 | B2 | * | 4/2007 | Cilluffo | ............... B60R 11/0235 297/188.06 |

(Continued)

FOREIGN PATENT DOCUMENTS

| CN | 204279267 U | 4/2015 |
| CN | 104786955 A | 7/2015 |
| WO | 2007075461 A2 | 7/2007 |

*Primary Examiner* — Chi Q Nguyen
(74) *Attorney, Agent, or Firm* — Quinn IP Law

(57) ABSTRACT

A support system is attachable to a seatback of a seat, via a pair of strut holders attached to the seatback. A headrest is attachable to the headrest via the strut holders. The support system operatively supports an accessory, relative to the seatback, via an attachment assembly. The attachment assembly includes a base member and a cover mount. The base member includes a base mount and a support flange. Portions of the base mount are operatively disposed between the support surface and each strut holder. The flange is configured to support the accessory, relative to the seatback. The cover mount is disposed in overlapping relationship with, and secured to, the base mount, such that each strut holder is sandwiched between the base mount and the cover mount, such that each strut holder is retained therebetween and the support system is operatively supported relative to the seatback.

16 Claims, 12 Drawing Sheets

(56) References Cited

U.S. PATENT DOCUMENTS

| | | | |
|---|---|---|---|
| 8,109,569 B2* | 2/2012 | Mitchell | B60R 11/0235 |
| | | | 297/217.3 |
| 8,730,413 B2 | 5/2014 | Tranchina | |
| 8,733,835 B2* | 5/2014 | Ulfig | B60N 2/60 |
| | | | 297/219.1 |
| 9,393,915 B2 | 7/2016 | Vitito | |
| 9,446,719 B2* | 9/2016 | Lee | B60R 11/0252 |
| 9,469,255 B2* | 10/2016 | Kucera | B60R 11/0235 |
| 2006/0087163 A1* | 4/2006 | Cilluffo | B60R 11/0235 |
| | | | 297/188.04 |
| 2009/0315368 A1* | 12/2009 | Mitchell | B60R 11/0235 |
| | | | 297/188.04 |
| 2011/0155873 A1 | 6/2011 | Montag et al. | |
| 2012/0018471 A1* | 1/2012 | Guillermo | B60R 11/0235 |
| | | | 224/275 |
| 2012/0125959 A1 | 5/2012 | Kucera | |
| 2012/0235001 A1* | 9/2012 | Somuah | B60R 11/0235 |
| | | | 248/287.1 |
| 2014/0077539 A1 | 3/2014 | Brawner | |
| 2016/0161052 A1* | 6/2016 | Griggs | F16M 11/24 |
| | | | 320/108 |

* cited by examiner

VEHICLE SEAT ACCESSORY MOUNTING SYSTEM

CROSS-REFERENCE TO RELATED APPLICATIONS

This application claims the benefit of U.S. Provisional Application No. 62/199,668, filed on Jul. 31, 2015, which is hereby incorporated by reference in its entirety.

TECHNICAL FIELD

The present disclosure is related to a vehicle seat accessory mounting system.

BACKGROUND

Electronic devices, such as smart phones, tablets, personal digital assistants (PDAs), global position systems (GPS), and the like are widely used by passengers of vehicles. Such devices provide the benefit of portability, allowing the passengers to bring the device with them, for use in the vehicle, while also allowing the passengers to take the device with them as they exit the vehicle.

SUMMARY

An attachment assembly for attachment to a seatback of a seat having a support surface and a strut holder attached to the seatback at the support surface is configured to operatively support an accessory, relative to the seatback. The strut holder defines a strut hole configured to receive a strut of a headrest therein. The attachment assembly includes a base member and a cover mount. The base member includes a base mount and a support flange extending from the base mount. A portion of the base mount is configured to be operatively disposed between the support surface and the strut holder. The flange is configured to operatively support the accessory. The cover mount is configured to be disposed in overlapping relationship with at least the portion of the base mount, such that the strut of the seatback is sandwiched between the base mount and the cover mount. The cover mount is configured to be secured to the base member, such that the strut holder is retained therebetween and the attachment assembly is thereby operatively supported, relative to the seatback.

A support system is for attachment to a seatback of a seat having a support surface with a pair of strut holders attached to the seatback, at the support surface. The support system is configured to operatively support an accessory, relative to the seatback. Each strut holder includes a head defining a strut hole configured to receive a strut of a headrest therein. The support system includes a support member and an attachment assembly. The support member is configured to operatively support the accessory relative to the seatback. The attachment assembly includes a base member and a cover mount. The base member includes a base mount and a support flange extending from the base mount. Portions of the base mount are configured to be operatively disposed between the support surface and the head of each strut holder. The flange is configured to be operatively attached to the support member. The cover mount is configured to be disposed in overlapping relationship with at least the portions of the base mount, such that the head of each strut holder is sandwiched between the base mount and the cover mount. The cover mount is configured to be secured to the base member, such that each strut holder is retained therebetween and the support system is operatively supported relative to the seatback.

A seat for a vehicle includes a seatback, a headrest, and a support system. The seatback presents a support surface. The pair of strut holders are operatively attached to the seatback at the support surface. Each strut holder includes a head and a rod that extends from the head, through the support surface and into engagement with the seatback. The headrest is operatively engaged with each of the strut holders. The support system includes a support member and an attachment assembly. The support member is configured to operatively support the accessory relative to the seatback. The attachment assembly includes a base member and a cover mount. The base member includes a base mount and a support flange extending from the base mount. A portion of the base mount is operatively disposed between the support surface and the head of each strut holder. The flange is operatively attached to the support member. The cover mount is disposed in overlapping and nesting relationship with at least the portion of the base mount, such that the head of each strut holder is sandwiched between the base mount and the cover mount. The cover mount is secured to the base member, such that each strut holder is retained therebetween and the support system is operatively supported relative to the seatback.

The above noted and other features and advantages of the present disclosure are readily apparent from the following detailed description when taken in connection with the accompanying drawings.

DETAILED DESCRIPTION

Figure 1:
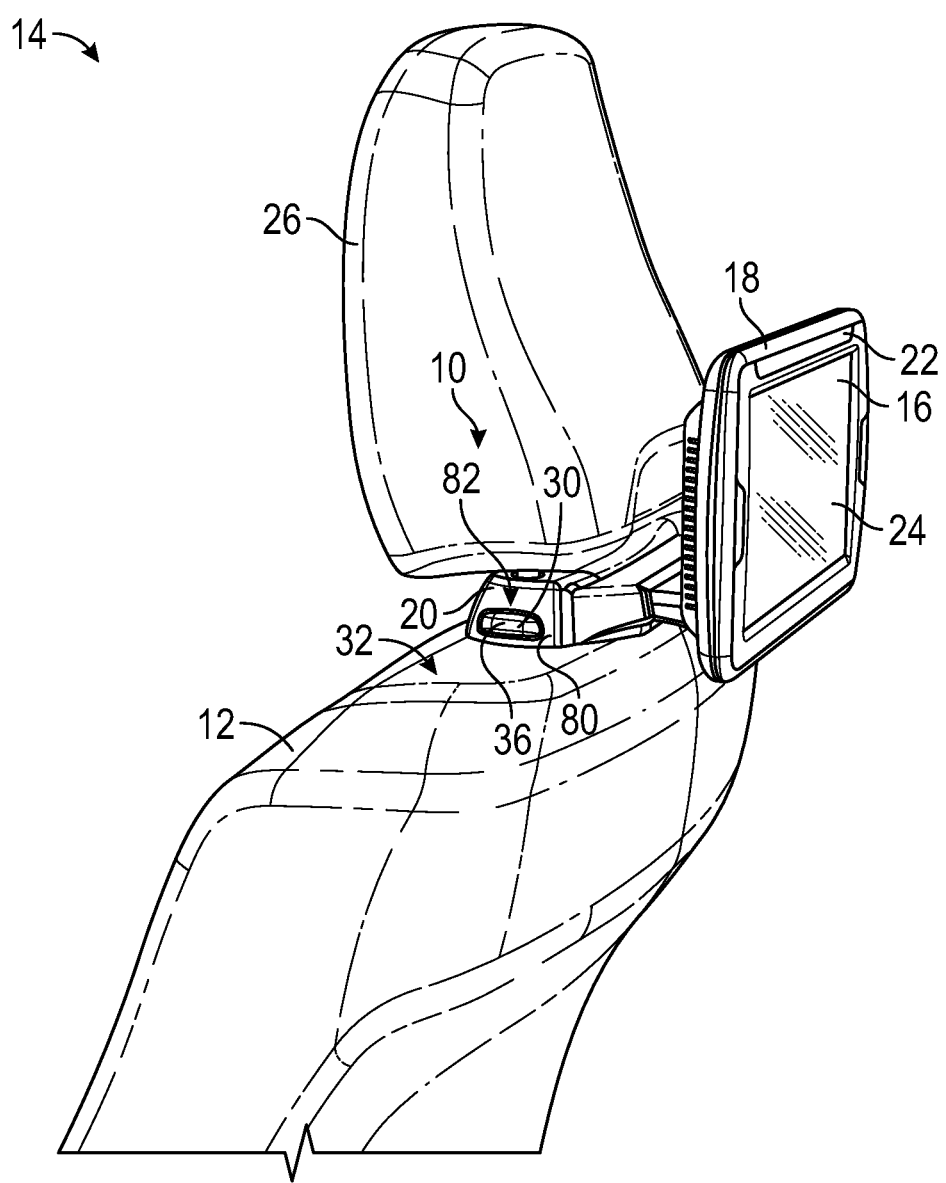
FIG. 1 is a schematic fragmentary, perspective rear view of a seat with a support system attached to a seatback.

Referring to the drawings, wherein like reference numbers refer to like components throughout the several Figures, a support system 10 is attached to a seatback 12 of a seat 14 for a vehicle, as shown schematically in FIG. 1. The support system 10 is configured for holding at least one apparatus 16, such as a portable electronic device 16 (PED), a video screen, a coat hanger, a hook and/or the like. The PED 16 may be one or more of a tablet, a smart phone, and the like for viewing and/or use by a person located behind the seat 14. However, it should be appreciated that the support system 10 is not limited to holding a PED 16, but may also be configured to support other items, such as clothing hangers, bags, and the like.

With continued reference to FIG. 1, the support system 10 includes a support member 18 and an attachment assembly 20. The attachment assembly 20 is configured for attachment to the seatback 12, and the support member 18 attachment assembly 20. The support member 18 is configured to operatively support one or more of the accessories, i.e., the PED 16 and/or other items, relative to the seatback 12. As such, the attachment assembly 20 operatively supports the support member 18, and any accessory 16 attached to the support member 18, relative to the seatback 12. The attachment assembly 20 and the support member 18 may be configured such that the support member 18 is removably attachable to the attachment assembly 20 to accommodate interchangeability between different attachment assemblies 20 for supporting other PEDs 16 or any other items or accessories.

The support member 18 may include a support frame 22 configured to at least partially surround a video screen 24 of the accessory 16, while keeping the viewing screen visible to the person located behind the seat 14. Alternatively, the support member 18 may be configured to support, alone or in combination, other accessories 16, such as a coat hook, a coat hanger, a PED holder, a hook, and/or the like. The support member 18 may also be configured to support different sized PEDs 16, regardless of the shape of the PED 16 or the passenger's choice of a cover for the PED 16.

Figure 2:
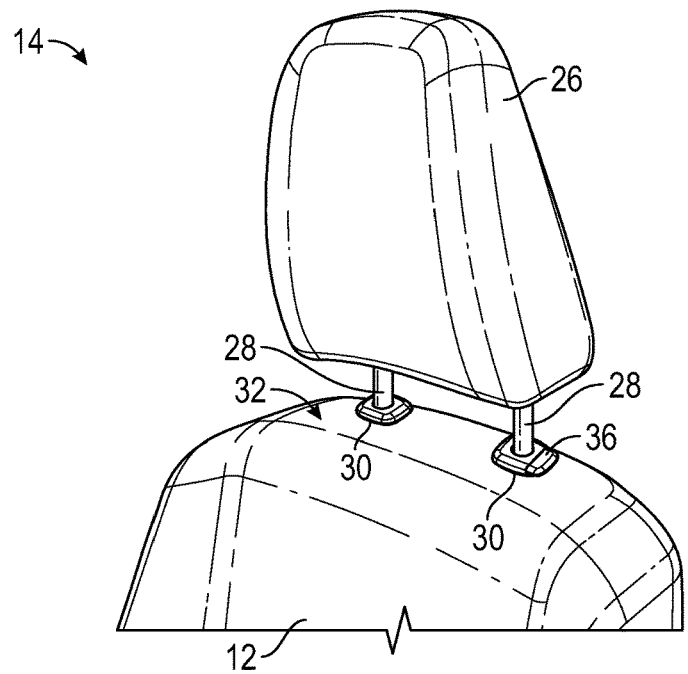
FIG. 2 is a schematic fragmentary, perspective front view of the seatback with a headrest attached thereto.
Figure 3:
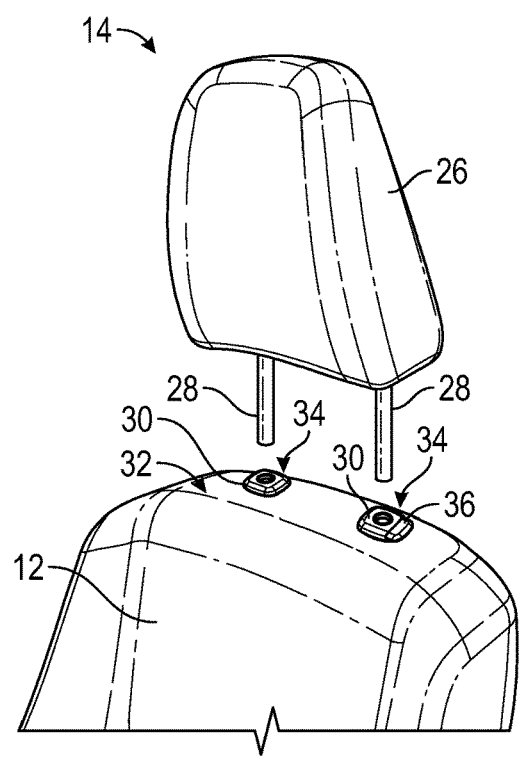
FIG. 3 is a schematic fragmentary, perspective front view of the seatback with the headrest removed therefrom.
Figure 12:
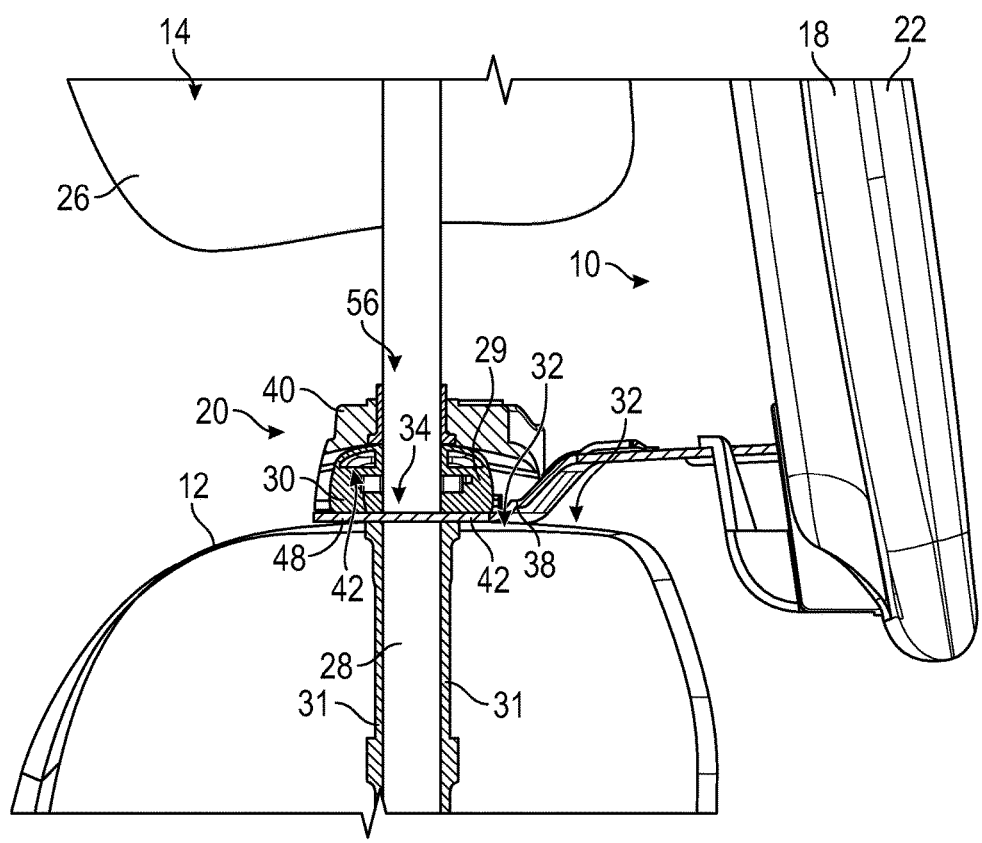
FIG. 12 is a schematic fragmentary, side sectional view of the seatback and the support system.

Referring now to FIGS. 1-3, the support system 10 is attachable to the seatback 12 of the seat 14, which includes a headrest 26. The headrest 26 includes a pair of struts 28 that slidably extend into the seatback 12, through a respective strut holder 30. Referring specifically to FIG. 3, the seatback 12 presents a support surface 32, and the pair of strut holders 30 are operatively attached to, and supported by, the support surface 32 of the seatback 12. Referring specifically to FIG. 12, each strut holder 30 includes a head 29 and a generally hollow rod 31, which extends from the head 29, through the support surface 32, into the seatback 12. The strut holder 30 is operatively secured to the seatback 12. Each strut holder 30 defines a strut hole 34, which opens through the head 29 and the hollow rod 31 to allow the strut 28 to extend into the seatback 12.

The struts 28 are inserted into the respective strut hole 34, when the headrest 26 is operatively attached to the seatback 12. The headrest 26 may be adjustable, relative to the support surface 32 of the seatback 12. In order to facilitate the adjustment, at least one of the strut holders 30 may include a button 36 (see for example FIG. 13) that is configured to be depressed by a person. Upon depressing the button 36, the headrest 26, including the struts 28 are slidable within the strut holes 34 of the strut holders 30, relative to the strut holders 30 and the seatback 12. As such, the headrest 26 is movable toward and/or away from the support surface 32 and the strut holders 30. Likewise, the corresponding strut 28 is restrained from moving relative to the support surface 32, by virtue of releasing the button 36. Alternatively, the headrest 26 may not be adjustable, relative to the support surface 32 of the seatback 12 without depressing a button 36. With this type of headrest 26, different positions of the headrest 26 may be achieved by using detents (not shown) that achieve different positions of the headrest 26. Also, the headrest 26 may be configured to not be adjustable, but may still be removably attached to the seatback 12 by virtue of struts 28 being slidably engaged with respective strut holders 30 in the seat 14. The headrest 26 is removed from the seatback 12 prior to attaching the support system 10 to the strut holders 30 and the seatback 12.

Figure 5:
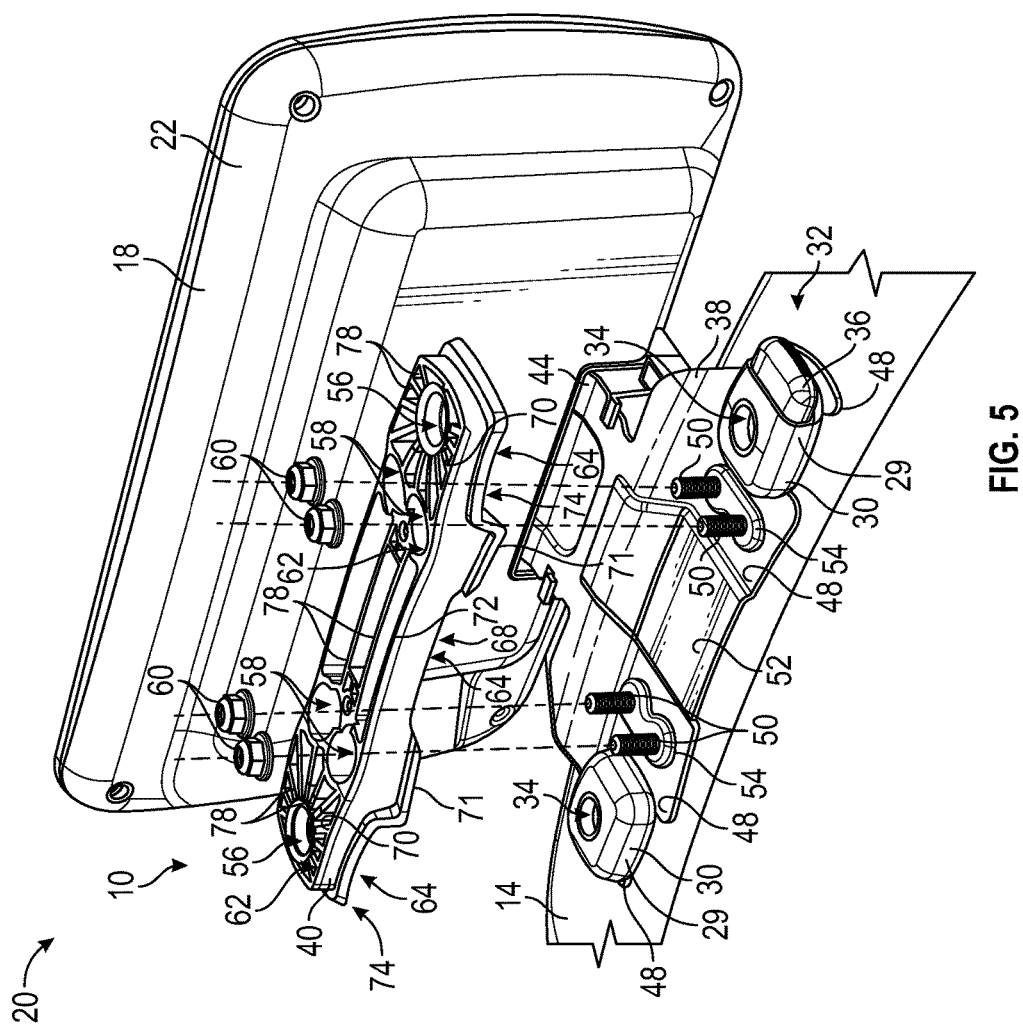
FIG. 5 is a schematic fragmentary, exploded perspective front view of the support system partially attached to the seatback detached from the seatback.
Figure 6:
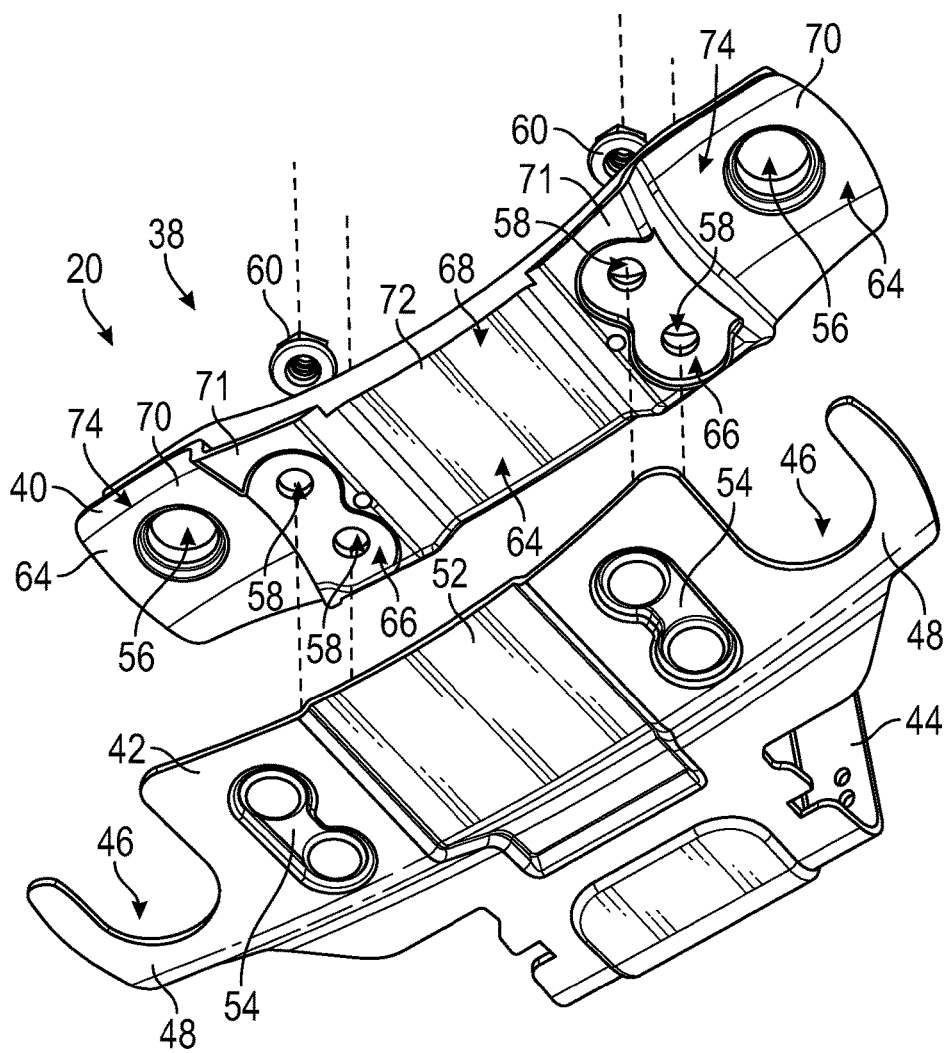
FIG. 6 is a schematic fragmentary, perspective bottom view of an attachment assembly of the support system.
Figure 7:
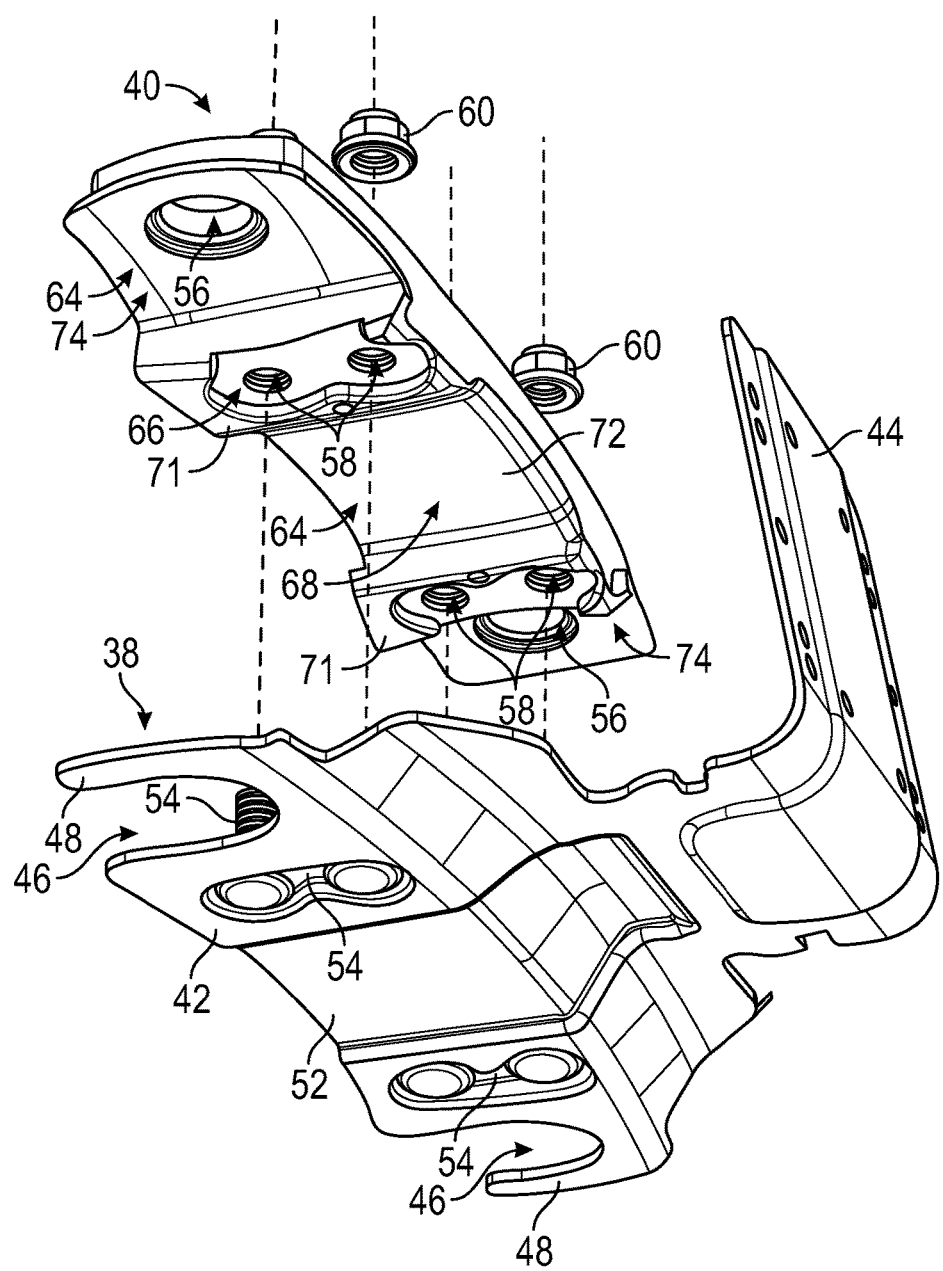
FIG. 7 is a schematic fragmentary, perspective bottom and side view of the attachment assembly of the support system.

Referring now to FIGS. 5-7, the attachment assembly 20 includes a base member 38 and a cover mount 40. The base member 38 may be formed from metal, such as mild steel. However, it should be appreciated that other high strength materials may also be used in forming the base member 38. The cover mount 40 may be formed from a high strength plastic. However, any suitable material may be used in forming the cover mount 40. With specific reference to FIG. 7, the attachment number 20 includes a base mount 42 and a support flange 44. The base mount 40 is configured to be supported by the support surface 32 of the seatback 12. The support flange 44 may extend from the base mount 42 in a generally perpendicular direction. More specifically the support flange 44 is configured to be operatively engaged with, or otherwise attached to, the support frame 22, as shown in FIG. 5. However, it should be appreciated that the support flange 44 is not limited to extending from the base mount 42 in a generally perpendicular direction, but may also be configured to extend at any other desired angle such that the support member 18 is operatively supported by the attachment assembly 38.

Figure 4:
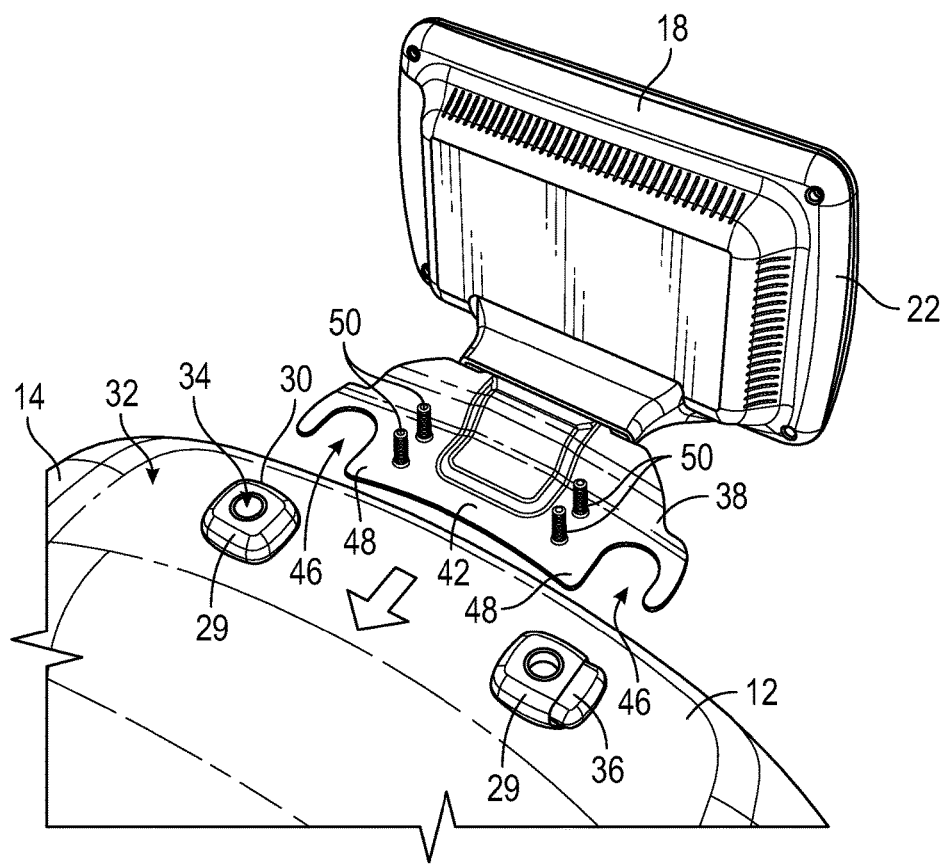
FIG. 4 is a schematic fragmentary and perspective top and front view of the seatback and the support system.
Figure 13:
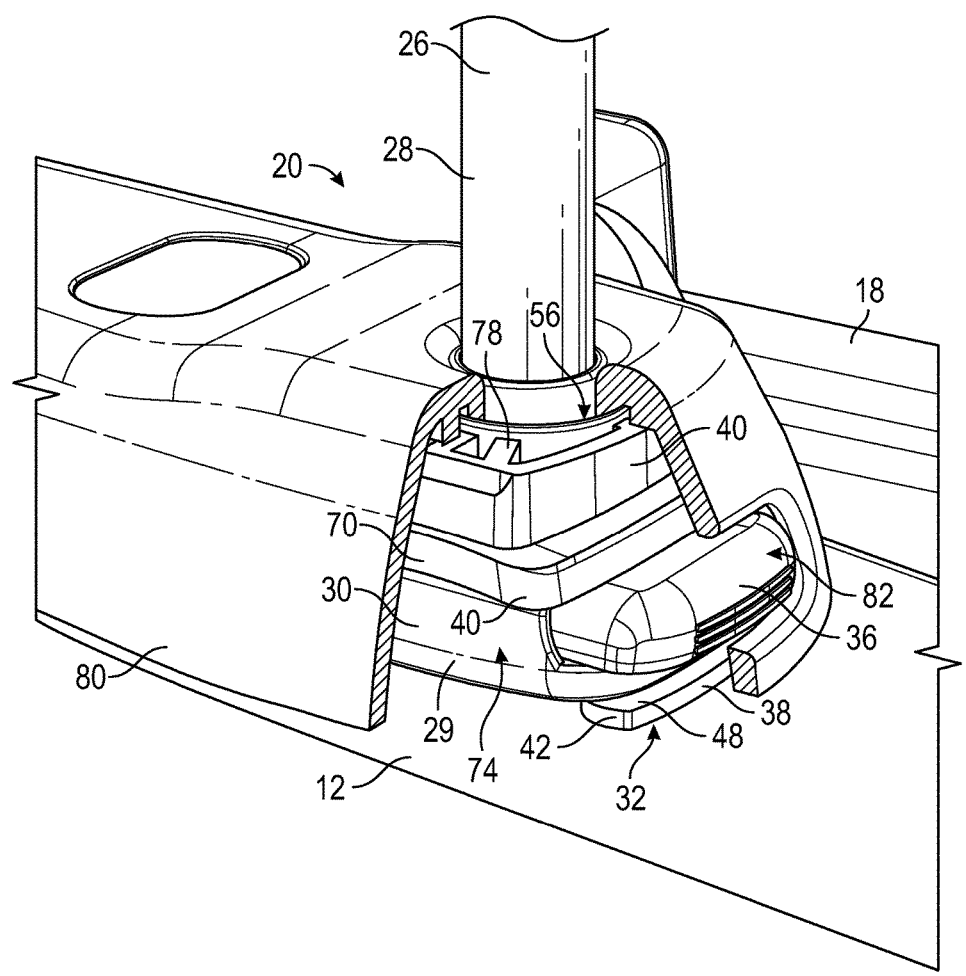
FIG. 13 is a schematic fragmentary, partial perspective end view of the seatback and the support system.

Referring now to FIG. 4, the base mount 42 includes a pair of feet 48, where each foot 48 defines a slot 46. Referring to FIGS. 5, 12, and 13, each foot 48 is configured to be inserted between the head 29 of the strut holder 30 and the support surface 32, such that the rod 31 is disposed within the respective slot 46. As such, the rod is at least partially surrounded by the respective foot 48. Each slot 46 may be D-shaped. Likewise, each rod 31 may have a corresponding shape that is configured to be received within the corresponding slot 46. Each foot 48 is sized and shaped to fit between the support surface 32 and the head 29 of the respective strut holder 30 so that a portion of each foot 48 is sandwiched between the support surface 32 and the head 29 of the respective strut holder 30. At least one stud 50 extends from the base mount 42. More preferably, two pairs of studs 50 may extend from the base mount 42, where each pair of studs 50 extends from a respective one of the feet 48. Each foot 48 may also present at least one boss 54. The studs 50 extend through a respective boss 54. A plateau 52 may extend between the feet 48, opposite a direction of the support surface 32, such that the plateau 52 and the feet 48 are non-planar with one another.

Referring now to FIGS. 5-7 and 11, the cover mount 40 is configured to be disposed over the base mount 42 and each of the strut holders 30 to sandwich the strut holders 30 therebetween. The cover mount 40 presents a top surface 62 and a base surface 64 opposite the top surface 62. The cover mount 40 defines a pair of passages 56 extending between the surfaces 62, 64, where the passages 56 are configured to be aligned with the respective strut hole 34. The passages 56 are configured to receive the respective strut 28 therein, when the headrest 26 is reattached to the seatback 12 (as shown in FIG. 12). Each passage 56 may be sized to provide a snug fit to the strut 28 of the headrest 26. The passage 56 may be directly sized within the cover mount 40 or be sized through the use of a collar sleeve spacer. Therefore, when the support system 10 is attached to the seatback 12, the headrest is 26 still movable relative to the support surface 32 of the seatback 12. Further, movement of the headrest 26 relative to the support surface 32 does not cause a corresponding change of position of the support system 10, i.e., the viewing screen 24 or any other accessory item.

Referring specifically to FIG. 5, the tables 71 of the cover mount 40 define a plurality of mount holes 58 extending between surfaces 62, 64. Each mount hole 58 is configured to receive a respective stud 50 therethrough, when the cover mount 40 is disposed over the base mount 42. A nut 60 may be secured to each stud 50, such that the cover mount 40 is secured to the base mount 42, where the combination of the cover mount 40 and the base mount 42 are operatively secured to the seatback 12 by virtue of the strut holders 30 being secured therebetween.

Referring to FIGS. 6 and 7, the cover mount 40 includes a central region 72, a pair of tables 71, and a pair of shoulders 70. The pair of shoulders 70 are disposed at opposite ends of the cover mount 40. One of the tables 71 is disposed between the central region 72 and a respective shoulder 70. When the cover mount 40 is disposed in overlapping relationship with the base mount 42, each shoulder 70 overlaps the respective foot 48, each table 71 overlaps the respective boss 54, and the central region 72 overlaps the plateau 52.

The base surface 64 of each shoulder 70 extends from the table 71 in stepped and generally parallel relationship to define a recess 74. Likewise, the base surface 64 of the central region extends from each of the tables 71 in stepped and parallel relationship, such that each shoulder 70 is offset from the respective table 71, to define a relief 68. The base surface 64 of each table 71 may define a cavity 66, where each cavity 66 corresponds in shape to the respective boss 54 that extends from the respective foot 48 of the base mount 42. As such, when the cover mount 40 is disposed over the base mount 42, each boss 54 may nest within the respective cavity 66. Likewise, the relief 68 may be shaped such that the plateau 52 nests therein when the cover mount 40 is disposed over the base mount 42. The relief 68 corresponding to each shoulder 70, is configured to provide sufficient clearance to sandwich the respective strut holder 30 between the foot 48 and the shoulder 70. Therefore, the cover mount 40 is sized and shaped to match a profile of the support surface 32 of the seatback 12, the strut holders 30, and the base mount 42. Specifically, the cover mount 40 is configured to nest with the base mount 42. As such, when the cover mount 40 is secured to the base mount 42, the base surface 64 conforms the support surface 32 of the seatback 12, the strut holders 30, and the base mount 42 to provide a generally even and strong surface for the cover mount 40 to clamp against.

Figure 8:
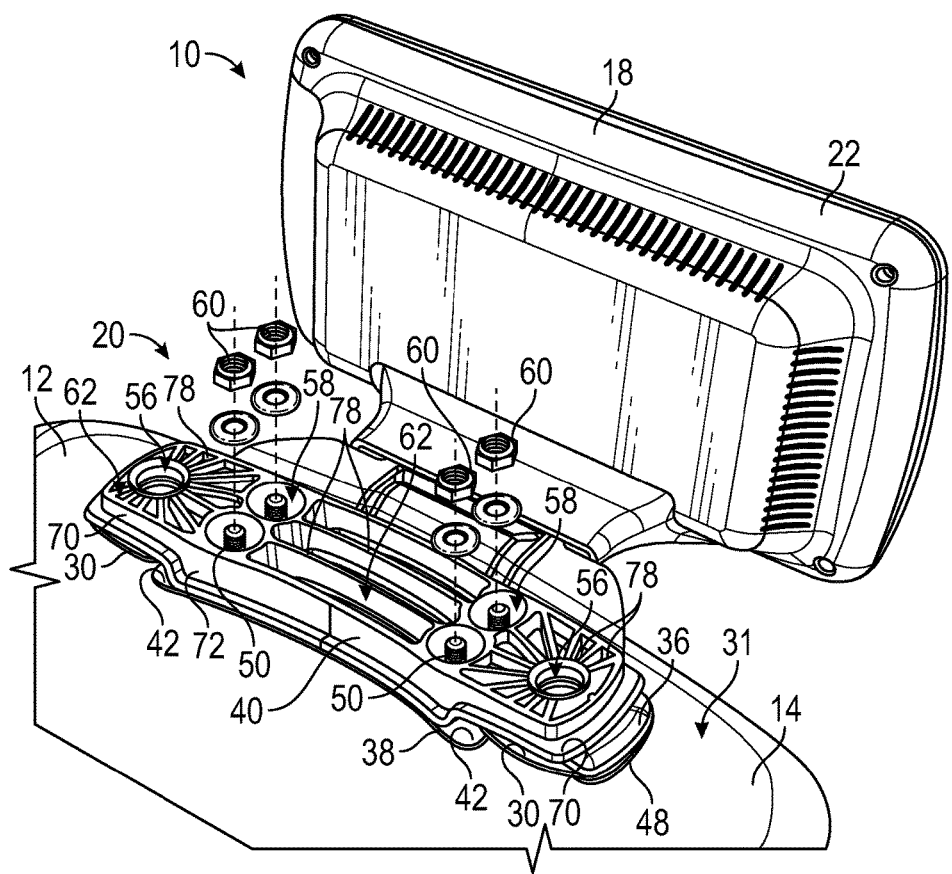
FIG. 8 is a schematic fragmentary, perspective partially exploded top/rear view of the support system partially attached to the seatback.

With reference to FIGS. 5, 8, and 13, the cover mount 40 may include a plurality of strengthening ribs 78. The base member 38 provides an energy absorbing structure to support the support member 18.

Figure 9:
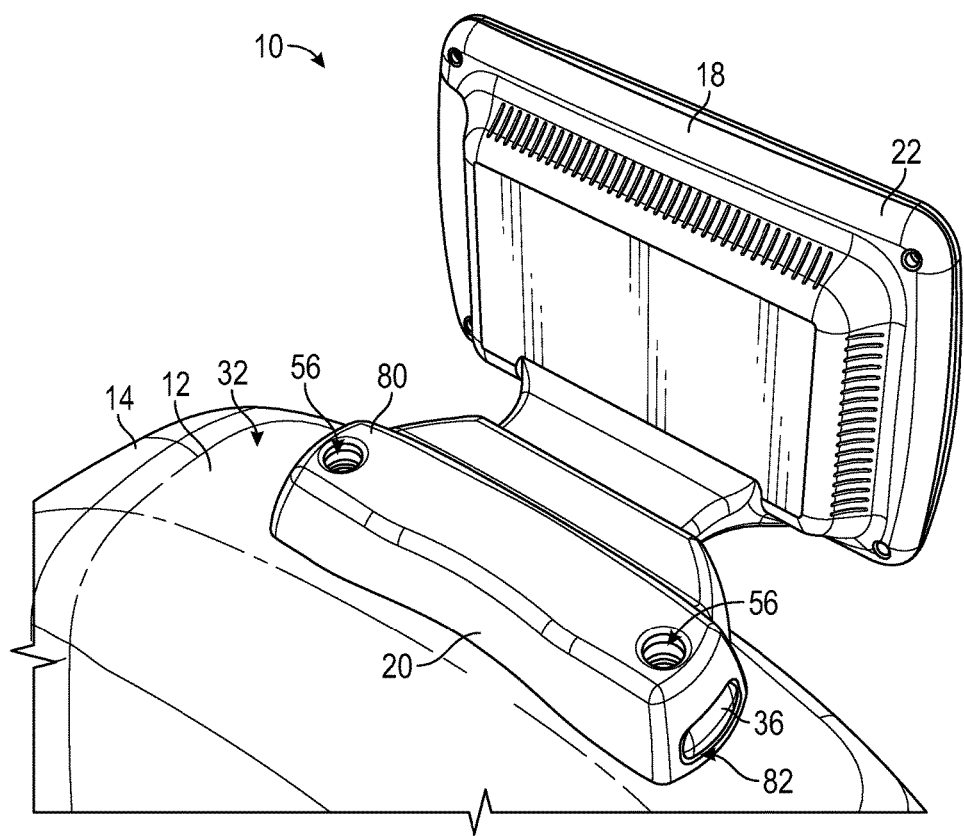
FIG. 9 is a schematic fragmentary, perspective top view of the support system attached to the seatback.
Figure 10:
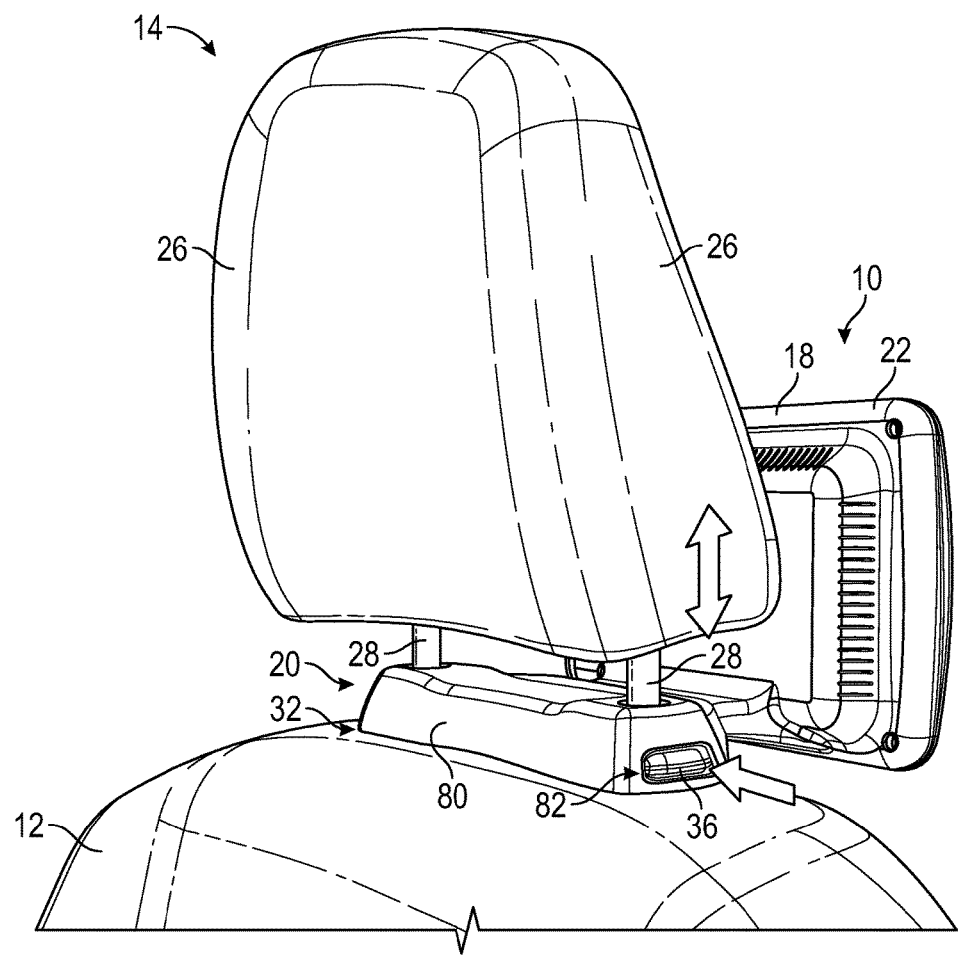
FIG. 10 is a schematic fragmentary, perspective front/side view of the support system attached to the seatback with the headrest attached to the seatback through the support system.
Figure 11:
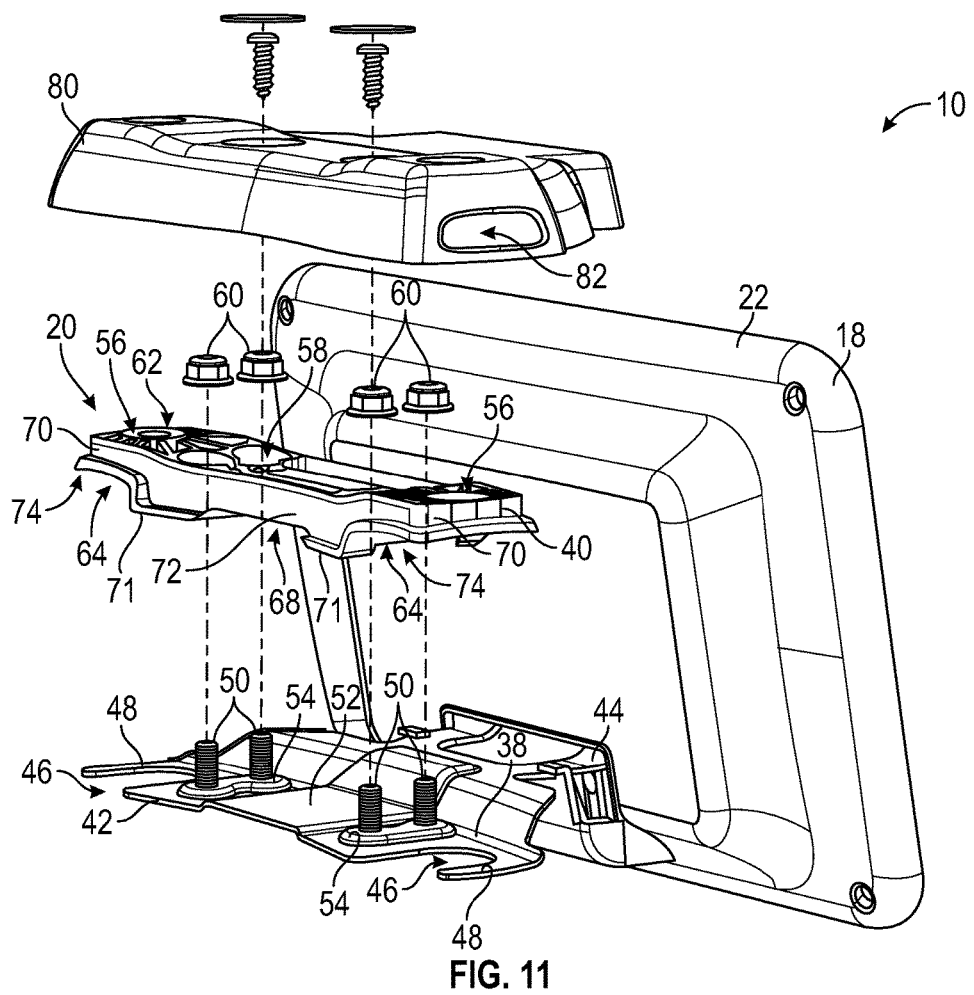
FIG. 11 is a schematic fragmentary, exploded perspective view of the support system.

Referring now to FIGS. 9-11, a cover plate 80 may be disposed over the cover and base mounts 38, 40 on the seatback 12. The cover plate 80 may be configured to be clipped, bolted, screwed, or otherwise secured to the cover mount 40 and/or the base mount 42. The cover plate 80 is configured to provide a positive pressure to the support surface 32 of the seatback 12. Such a positive pressure to the support surface 32 provides a factory-fitted look to the support system 10 upon installation to the seatback 12. Further, the cover plate 80 may define a window 82, through which the button 36 may extend or otherwise be accessible, to adjust the headrest 26, as shown in FIG. 13.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An attachment assembly for attachment to a seatback of a seat having a strut holder attached to the seatback to operatively support an accessory, relative to the seatback, the attachment assembly comprising:
    a base member including a base mount and a support flange extending from the base mount;
    wherein the base mount includes a foot defining a slot;
    wherein a portion of the foot is configured to be operatively disposed between a support surface of the seatback and the strut holder such that a rod of the strut holder is operatively received in the slot;
    wherein the support flange is configured to operatively support the accessory;
    a cover mount configured to be disposed in overlapping relationship with at least the portion of the foot, such that the strut holder of the seatback is sandwiched between the portion of the foot and the cover mount;
    wherein the cover mount presents a top surface and a base surface, opposite the top surface;
    wherein the cover mount defines a passage extending between the top surface and the base surface;
    wherein the passage is configured to be in alignment with a strut hole defined by the strut holder when the cover mount is disposed in overlapping relationship with at least a portion of the foot to receive a strut of a headrest therein; and
    wherein the cover mount is configured to be secured to the base member, such that the strut holder is retained therebetween and the attachment assembly is operatively supported relative to the seatback.

2. The attachment assembly, as set forth in claim 1, wherein the slot is D-shaped.

3. The attachment assembly, as set forth in claim 1, wherein the base mount includes a plateau extending from the foot, such that the plateau extends in stepped and generally parallel relationship to the foot;
    wherein the cover mount includes a shoulder, a table, and a central region;
    wherein the table extends between the shoulder and the central region;
    wherein the shoulder defines the passage and is configured to be disposed in overlapping relationship with a portion of the foot and the slot;
    wherein the table is configured to be disposed in overlapping relationship another portion of the foot, adjacent the slot; and
    wherein the central region is configured to be disposed in overlapping relationship with at least a portion of the plateau.

4. The attachment assembly, as set forth in claim 3, wherein the base surface of the shoulder extends from the table in stepped relationship to define a recess configured to receive a portion of the strut holder therein when the cover mount is disposed in overlapping relationship with at least a portion of the base mount, such that the strut holder is retained between the cover mount and the base member; and
    wherein the base surface of the central region extends from the table in stepped relationship to define a relief configured to receive at least a portion of the plateau therein when the cover mount is disposed in overlapping relationship with at least a portion of the base mount.

5. The attachment assembly, as set forth in claim 4, wherein a boss protrudes from the foot of the base mount;
wherein the base surface of the table defines a cavity configured to receive the boss therein when the cover mount is disposed in overlapping relationship with at least a portion of the base mount;
wherein the table defines a mount hole extending between the top surface and the base surface;
wherein the base member further includes a stud operatively extending from the boss; and
wherein the mount hole is configured to operatively receive the stud therein when the cover mount is disposed on overlapping relationship with at least a portion of the base mount.

6. The attachment assembly, as set forth in claim 1, further comprising a cover plate configured to be operatively disposed over the cover mount and the base mount, once the cover mount is disposed in overlapping relationship with at least a portion of the base mount.

7. The attachment assembly, as set forth in claim 6, wherein the cover plate is configured to be secured to at least one of the cover mount and the base mount, such that the cover plate provides positive pressure to the support surface of the seatback.

8. The attachment assembly, as set forth in claim 6, wherein the cover plate defines a window configured to provide access a button of the strut holder.

9. A support system for attachment to a seatback of a seat having a pair of strut holders attached to the seatback to operatively support an accessory, relative to the seatback, with each strut holder including a head defining a strut hole configured to receive a strut of a headrest therein, the support system comprising:
a support member configured to operatively support the accessory relative to the seatback; and
an attachment assembly including:
a base member including a base mount and a support flange extending from the base mount;
wherein the base mount includes a pair of feet, wherein each of the feet defines a slot;
wherein a portion of each of the feet are configured to be operatively disposed between a support surface of the seatback and the head of each strut holder, such that a rod of the strut holder is operatively received in the slot;
wherein the support flange is configured to be operatively attached to the support member;
a cover mount configured to be disposed in overlapping relationship with at least the portions of the feet, such that the head of each strut holder is sandwiched between the portions of the feet and the cover mount;
wherein the cover mount presents a top surface and a base surface, opposite the top surface;
wherein the cover mount defines a pair of passages extending between the top surface and the base surface;
wherein each of the passages is configured to be in alignment with a respective strut hole defined by the respective strut holder when the cover mount is disposed in overlapping relationship with at least a portion of the respective foot to receive a respective strut of a headrest therein; and
wherein the cover mount is configured to be secured to the base member, such that each strut holder is retained therebetween and the support system is operatively supported relative to the seatback.

10. The support system, as set forth in claim 9, wherein the base mount includes a plateau extending between the pair of feet, such that the plateau extends in stepped relationship to each of the feet;
wherein the cover mount includes a pair of shoulders, a pair of tables, and a central region;
wherein each of the tables extend between the respective shoulder and the central region;
wherein each of the shoulders defines the passage and is configured to be disposed in overlapping relationship with a portion of the respective foot and the respective slot;
wherein each the tables is configured to be disposed in overlapping relationship another portion of the respective foot, adjacent the respective slot; and
wherein the central region is configured to be disposed in overlapping relationship with at least a portion of the plateau.

11. The support system, as set forth in claim 10, wherein the base surface of each of the shoulders extends from the respective table in stepped relationship to define a respective recess configured to receive a portion of the head of the respective strut holder therein when the cover mount is disposed in overlapping relationship with at least a portion of the base mount; and
wherein the base surface of the central region extends from the table in stepped relationship to define a relief configured to receive at least a portion of the plateau therein when the cover mount is disposed in overlapping relationship with at least a portion of the base mount.

12. The support system, as set forth in claim 11, wherein a boss protrudes from each of the feet of the base mount;
wherein the base surface of each of the tables defines a cavity configured to receive the respective boss therein when the cover mount is disposed in overlapping relationship with at least a portion of the base mount.

13. The support system, as set forth in claim 11, wherein the table defines a mounting hole extending between the top surface and the base surface;
wherein the base member further includes a stud operatively extending from the boss; and
wherein the mounting hole is configured to operatively receive the stud therein when the cover mount is disposed on overlapping relationship with at least a portion of the base mount.

14. The support system, as set forth in claim 9, further comprising a cover plate configured to be operatively disposed over the cover mount and the base mount, once the cover mount is disposed in overlapping relationship with at least a portion of the base mount; and
wherein the cover plate is configured to be secured to at least one of the cover mount and the base mount, such that the cover plate provides positive pressure to the support surface of the seatback.

15. The support system, as set forth in claim 14, wherein the cover plate defines a window configured to provide access to depress a button of the strut holder to adjust the headrest relative to the seatback.

16. A seat for a vehicle comprising:
a seatback presenting a support surface;
a pair of strut holders operatively attached to the seatback at the support surface;

wherein each strut holder includes a head and a rod that extends from the head, through the support surface and into the seatback;

a headrest operatively engaged with each of the strut holders; and a support system including:
  a support member configured to operatively support the accessory relative to the seatback; and
  an attachment assembly including:
    a base member including a base mount and a support flange extending from the base mount;
    wherein a portion of the base mount is operatively disposed between the support surface and the head of each strut holder;
    wherein the support flange is operatively attached to the support member; and
    a cover mount disposed in overlapping and nesting relationship with at least the portion of the base mount, such that the head of each strut holder is sandwiched between the base mount and the cover mount;
    wherein the cover mount is secured to the base member, such that each strut holder is retained therebetween and the support system is operatively supported relative to the seatback.

* * * * *